(12) United States Patent
Malave

(10) Patent No.: US 12,642,262 B2
(45) Date of Patent: Jun. 2, 2026

(54) MOTH SCREEN FOR INSECT TRAPS

(71) Applicant: Woodstream Corporation, Lancaster, PA (US)

(72) Inventor: Adam V. Malave, Elizabethtown, PA (US)

(73) Assignee: Woodstream Corporation, Lancaster, PA (US)

( * ) Notice: Subject to any disclaimer, the term of this patent is extended or adjusted under 35 U.S.C. 154(b) by 0 days.

(21) Appl. No.: 18/726,718

(22) PCT Filed: Jan. 12, 2022

(86) PCT No.: PCT/US2022/012145
§ 371 (c)(1),
(2) Date: Jul. 3, 2024

(87) PCT Pub. No.: WO2023/136818
PCT Pub. Date: Jul. 20, 2023

(65) Prior Publication Data
US 2025/0057141 A1     Feb. 20, 2025

(51) Int. Cl.
*A01M 1/06* (2006.01)

(52) U.S. Cl.
CPC .................................... *A01M 1/06* (2013.01)

(58) Field of Classification Search
CPC ...................................................... A01M 1/06
See application file for complete search history.

(56) References Cited

U.S. PATENT DOCUMENTS

| | | | |
|---|---|---|---|
| 9,883,666 B1* | 2/2018 | Conklin | A01M 1/145 |
| 2014/0137462 A1* | 5/2014 | Rocha | A01M 1/023 43/113 |
| 2014/0165452 A1* | 6/2014 | Rocha | A01M 1/08 43/139 |
| 2016/0212984 A1* | 7/2016 | Fang | A01M 1/023 |
| 2017/0258068 A1* | 9/2017 | Eom | A01M 1/106 |
| 2019/0008132 A1* | 1/2019 | Eom | A01M 1/06 |

FOREIGN PATENT DOCUMENTS

| | | |
|---|---|---|
| EP | 3427581 A1 | 1/2019 |
| WO | 2018008923 A1 | 1/2018 |
| WO | 2019035683 A1 | 2/2019 |

OTHER PUBLICATIONS

PCT Notification dated Jul. 25, 2024, International Preliminary Report on Patentability, Application No. PCT/US2022-012145, 13 pages.
PCT Notification, The International Search Report and the Written Opinin of the International Searching Authority, PCT Application No. PCT/US2022/012145, dated Oct. 27, 2022, 20 pages.

* cited by examiner

*Primary Examiner* — Richard G Davis
(74) *Attorney, Agent, or Firm* — Barley Snyder

(57) ABSTRACT
An insect trap comprises a housing defining an insect intake opening. A receptacle is removably attached to a bottom of the housing and is in communication with the intake opening. A rotating fan assembly is arranged within the housing and is adapted to draw air in through the intake opening in a direction toward the receptacle. An insect screen is removably attached over the intake opening and defines a plurality of first openings sized to prevent insects of a predetermined average size from entering the intake opening.

19 Claims, 4 Drawing Sheets

MOTH SCREEN FOR INSECT TRAPS

FIELD OF THE INVENTION

The present invention relates to the field of pest control, and more particularly, to an improved insect trap and associated insect screen.

BACKGROUND

Insect traps, including live-catch traps and killing traps, may implement a fan for pulling insects from the environment into a receptacle. The traps may also implement a killing mechanism, such as an electrified feature, for killing insects prior to their introduction into the receptacle. While improving trap performance, the use of a fan and/or a killing mechanism creates a safety hazard not only for users, but for other animals which may interact with the trap inadvertently. For this reason, traps may implement a blocking element in the form of a screen, for example over and in front of these components, preventing a user from unintentionally interacting therewith (e.g., by blocking their fingers or hands).

Further, insect traps may be set in order to target particularly problematic types of insects. For example, a user may place a trap in order to capture or kill mosquitos and flies, which are typically viewed as bothersome. However, these traps often attract and thus capture or kill insects which are not desired to be targeted. For example, in some geographical regions certain insects are deemed beneficial to the environment, such as moths or bees.

Accordingly, an improved insect trap is needed which prevents inadvertent contact with hazardous features of the trap, as well as impedes undesired insects from being captured or killed.

SUMMARY

An insect trap according to an embodiment of the present disclosure comprises a housing defining an insect intake opening. A receptacle is removably attached to a bottom of the housing and is in communication with the intake opening. A rotating fan assembly is arranged within the housing and is adapted to draw air in through the intake opening in a direction toward the receptacle. An insect screen is removably attached over the intake opening and defines a plurality of first openings sized to prevent insects of a predetermined average size from entering the intake opening.

BRIEF DESCRIPTION OF THE DRAWINGS

The invention will now be described by way of example with reference to the accompanying figures, of which.

DETAILED DESCRIPTION OF THE EMBODIMENTS

Figure 1:
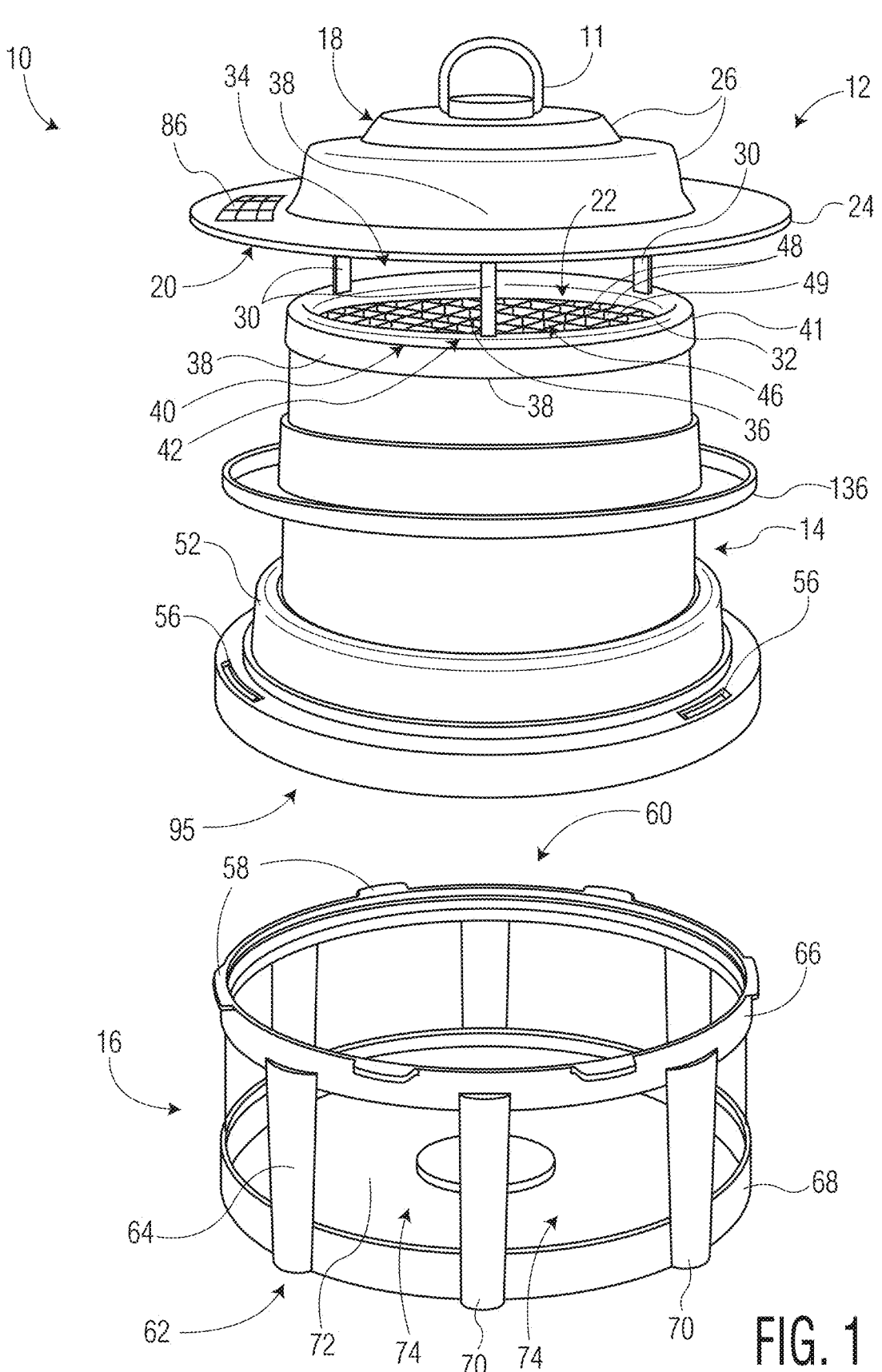
FIG. 1 is an exploded perspective view of an insect trap useful for describing embodiments of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include an insect trap and an associated insect screen or insect shield. In one embodiment, the trap may include an intake grill sized to prevent a user from inadvertently contacting internal components of the trap, such as a rotating intake fan. An insect screen or shield is provided and positioned above the grill. The insect screen defines a plurality of openings specifically sized to prevent one or more insect species from entering the trap through the intake grill. The insect screen is selectively removable such that a given trap may be configured and reconfigured for use with various target insects or configured to prevent various insect types from being captured thereby. In other embodiments, the insect shield may replace the intake grill entirely, and function to selectively prevent the capture of some insects as well as prevent inadvertent contact with internal components of the trap.

FIG. 1 shows an insect trap assembly 10 useful for describing embodiments of the present disclosure. The insect trap assembly 10 includes a cover or a roof 12 arranged over a trap housing or body 14, and a trap or receptacle 16 removably connected to the housing 14 and adapted retain insects. The roof 12 includes an exterior surface 18 that is oriented to face an operating environment, and an interior surface 20 that generally underlies the exterior surface 18 and faces a top surface 22 of the housing 14. The roof 12 includes a perimeter 24 that defines a footprint of the roof 12. Although shown as generally circular, it is appreciated that the perimeter 24 may have any shape. The exterior surface 18 of the roof 12 is bounded on its radial edges by the perimeter 24 and includes a number of ridges, contours or tiers 26 that extend in a gravitational direction relative to the intended orientation of the roof 12 during use of trap assembly 10. Although shown as having a generally upwardly directed convex shape, it is appreciated that the exterior surface 18 of the roof 12 could have a concave or toroidal shape with respect to the perimeter 24. Such a construction would allow the roof 12 of the trap assembly 10 to retain an amount of water, whether provided by a user or as rainfall, to attract insects to the trap assembly 10. The roof 12 preferably contains a hanging ring 11 in the middle of its exterior surface 18 for banging the trap assembly 10 by a book or other mounting apparatus. The roof 12 optionally contains a solar cell 86 for powering the various electrical components located in or on the trap assembly 10. It is appreciated that there may be a varying number of solar cells 86 and that they may be located anywhere on the trap assembly 10, such as on the roof 12 or the housing 14.

A number of posts 30 extend between the interior surface 20 of the roof 12 and the top surface 22 of the housing 14. The posts 30 are preferably spaced about a circumference associated with a radial perimeter 32 of the top surface 22 of the housing 14. The posts 30 define a gap 34 between the interior surface 20 of the roof 12 and the top surface 22 of the housing 14.

The gap 34 is shaped to allow insects to pass into the space between the roof 12 and the housing 14 and to be drawn and/or forced through the operational features of the trap assembly 10. It is appreciated that although three posts 30 are shown, other numbers of posts may be provided to create the offset or gap 34 between the roof 12 and the housing 14.

Still referring to FIG. 1, the radial perimeter 32 of the housing 14 receives the posts 30 through corresponding receiving holes 36 spaced about a circumference associated with the radially positioning of the posts 30. The posts 30 may be fixed within the holes 36 by an attachment means, such as bolts or screws 38, to prevent vertical movement of the posts 30. It is contemplated that posts 30 may be fixed by other means, such as by welding or an adhesive. In still other embodiments, the posts may be snap-fit into corresponding openings.

In one embodiment, the radial perimeter 32 is constructed of a reinforced plastic to provide radial strength to the housing 14 and support for the weight of the upper elements. The radial perimeter 32 may be embodied as a sleeve 41 with a cavity 40 to receive the upper perimeter 42 of the housing 14 within the cavity 40. The sleeve 41 is slid over the upper perimeter 42 to receive the edge of the upper perimeter 42. The sleeve 41 may be fixedly attached to the housing body by bolts or screws 38, or other attachment means. It is appreciated that the radial perimeter 32 may alternatively be a piece that is attached parallel to the upper perimeter 42 by a fastening means, such as a bolt or screw. It is also appreciated that the radial perimeter 32 may be provided as either a piece separate from the housing 14, or a reinforced edge on the housing 14 itself. Further, although the housing 14 is shown to have a generally cylindrical shape, it is appreciated that the housing 14 could have any shape.

Figure 2:
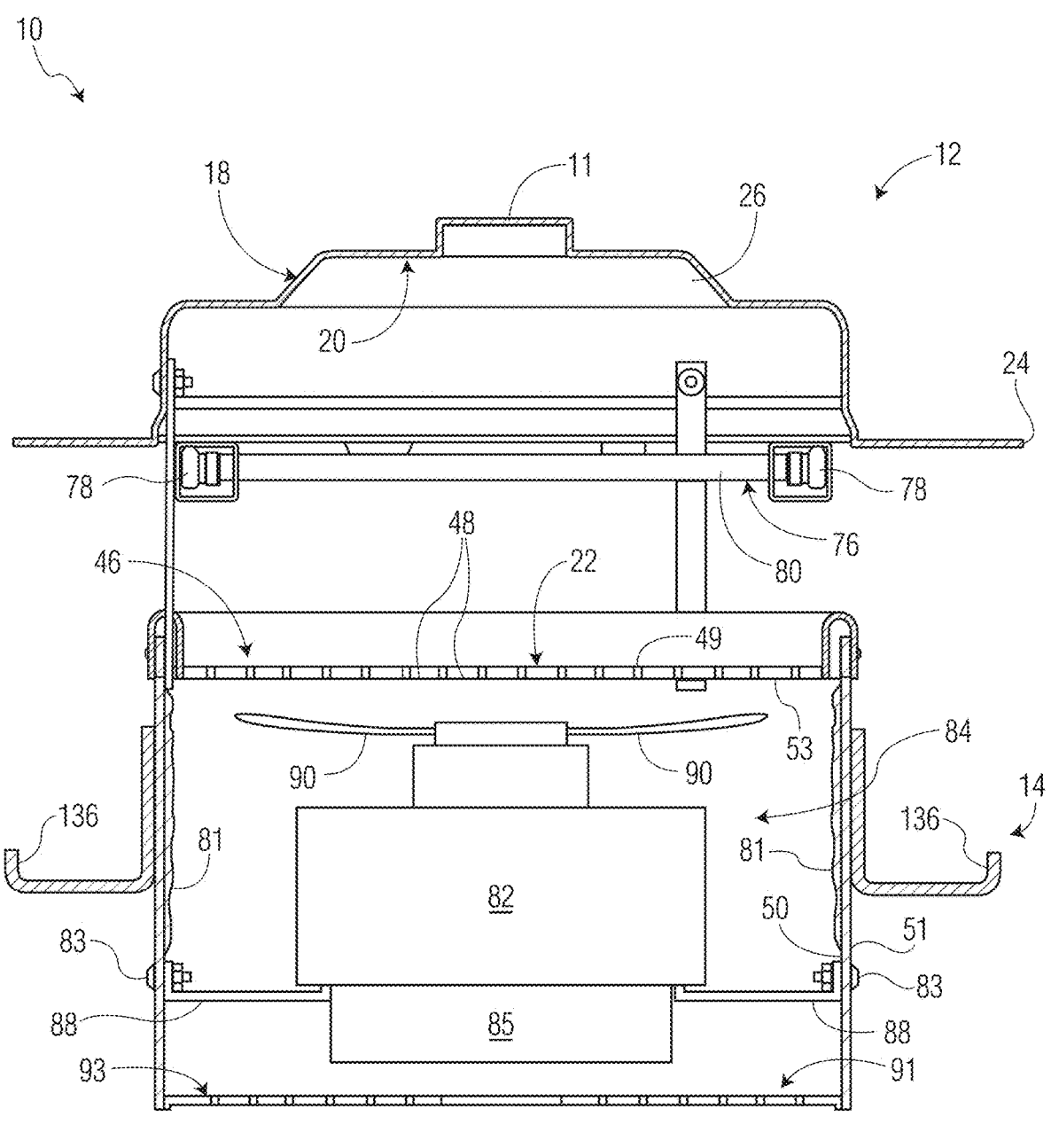
FIG. 2 is a cross-sectional view of the insect trap of FIG. 1 in an assembled state.

Referring now to FIGS. 1 and 2, a protective screen 46 is disposed across the top surface 22 of the housing 14. The first protective screen 46 includes an exposed top surface 49 that faces the interior surface 20 of the roof 12 and a bottom surface 53 that underlies the top surface 49 and faces inwardly into the interior 84 of the housing 14. The protective screen 46 is grated to provide for a plurality of openings 48 that allow air flow and insects to pass through the screen 46, but do not allow larger foreign objects to pass there beyond, such as the fingers of a user. In one embodiment, the protective screen 46 is coupled to the inner wall 50 of the housing 14 and suspended over the entire top surface 22 of the housing. As will be set forth in greater detail herein, an insect screen according to one embodiment of the present disclosure may be selectively fitted over the protective screen 46. In other embodiments, an insect screen according to an embodiment of the present disclosure may replace the protective screen 46 and be attached to the housing 14 and the roof 12 in a similar manner to that described above.

Still referring to FIGS. 1 and 2, insects attracted to the trap are drawn into the trap assembly 10 through the gap 34 between the posts 30 and enter the space between roof 12 and housing 14. Insects then enter the housing 14 by passing through the openings 48 of the screen 46 and pass into the interior 84 of the housing 14. The insects pass the operational features disposed in the interior 84 of housing 14 and exit the housing 14 by passing downward through a bottom base 52 of housing 14 and into the attached receptacle 16.

The bottom base 52 of the housing 14 has a generally cylindrical shape and corresponds to the shape of the housing 14. In the exemplary embodiment, the base 52 widens in a concave manner to provide an expanding diameter orifice or opening 95. However, it is appreciated that the bottom base 52 may be shaped in a number of ways and may not expand in diameter. The bottom base 52 is sized to overlap the upper perimeter 66 of the receptacle 16 to securely couple the housing 14 to the retaining cage 16. The bottom base 52 may also have a locking mechanism 54 consisting of locking holes 56 for receiving corresponding lock pieces 58 of the receptacle 16.

Referring to FIG. 2, the trap assembly 10 is configured for operation with a number of optional attractants. One such attractant is the generation of light rays. A light assembly 76 is coupled to the interior surface 20 of the roof 12 by one or more mounting brackets 78. The interior surface 20 may attach the mounting brackets 78 to receive the ends of one or more UV light bulbs 80 or other light sources. The light assembly 76 is attached to a power source, such as an AV power supply, battery source, or solar powered cells. The power source may be located on or in the trap assembly 10 or externally provided. In addition to or in the alternative, a carbon dioxide releasing substance 81 is provided. Specifically, the inner wall 50 of the housing 14 may be coated with the substance 81, such as titanium dioxide, which releases carbon dioxide when exposed to UV light rays. It should be appreciated that the substance may be coated at various locations on the trap, such as on the interior surface 20 of the roof 12 or on the exterior surface of the housing 14, by way of example only. Another attractant contemplated is sitting water, which may be provided by a water tray 136 coupled to the exterior surface 51 of the housing 14 to collect water. The water tray 136 may be removable or permanent and may be attached to the housing 14 via a number of methods, such as by screws or by being slidably fitted around the housing's circumference.

Insects that enter the housing 14 by passing through the openings 48 of the protective screen 46 pass through a number of operational features located in the interior 84 thereof. Specifically, within the interior 84 of the housing 14 is a fan assembly 82 which is fixably attached to the inner wall 50 of the housing by bolts 83, or the like, and suspended in the middle of the interior. The fan assembly 82 is attached to the inner wall 50 by a number of rigid suspension rods 88 that are bolted to the inner wall 50 and attached to the bottom portion 85 of the fan assembly. The suspension rods 88 are located so as not to interfere with movement of rotating blades 90 of the fan assembly 82.

The rotating blades 90 of the fan assembly 82 preferably rotate in a horizontal plane that is aligned between the first protective screen 46 and a second protective screen 91. It is contemplated that the blades 90 may be provided at different pitches in order to create a desired air flow or vacuum effect through the housing 14 an in a direction of the receptacle (not shown in FIG. 2). It is also contemplated that the fan assembly 82 may be located at different locations within the interior 84 of the housing 14. That is the fan assembly 82 need not be centrally located and/or can be disposed nearer one of screens 46, 91.

The second protective screen 91 is disposed below the fan assembly 82 and includes an upper surface 93 that faces inwardly toward the housing interior 84 and a bottom surface 92 that generally underlies the upper surface 93. The protective screen 91 is grated to provide for a plurality of openings 94 that allow air flow and desired insects to pass therethrough. The protective screen 91 is coupled to the inner wall 50 of the housing 14 and is suspended over the entire bottom opening 95 of the housing. As set forth above, the screen 91 prevents unintended objects from inadvertently passing into housing 14 but is constructed to allow insects to pass fairly unobstructed therethrough.

Figure 3:
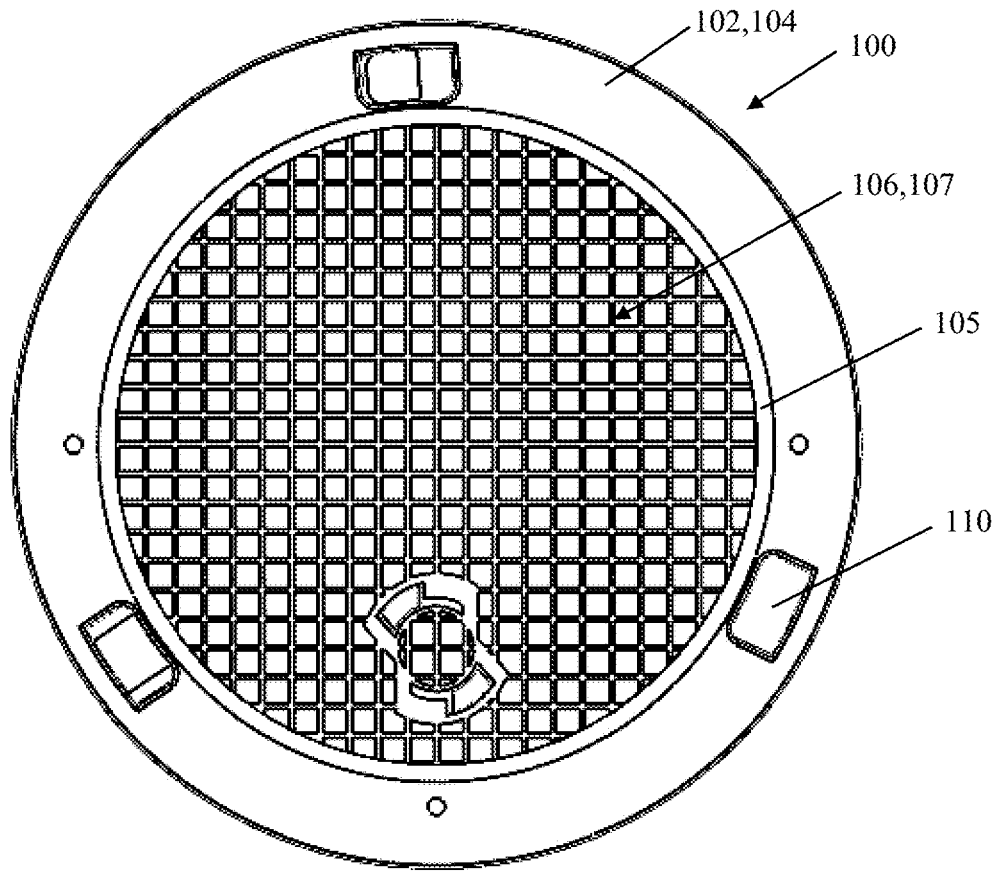
FIG. 3 is a top view of an insect screen according to an embodiment of the present disclosure.
Figure 4:
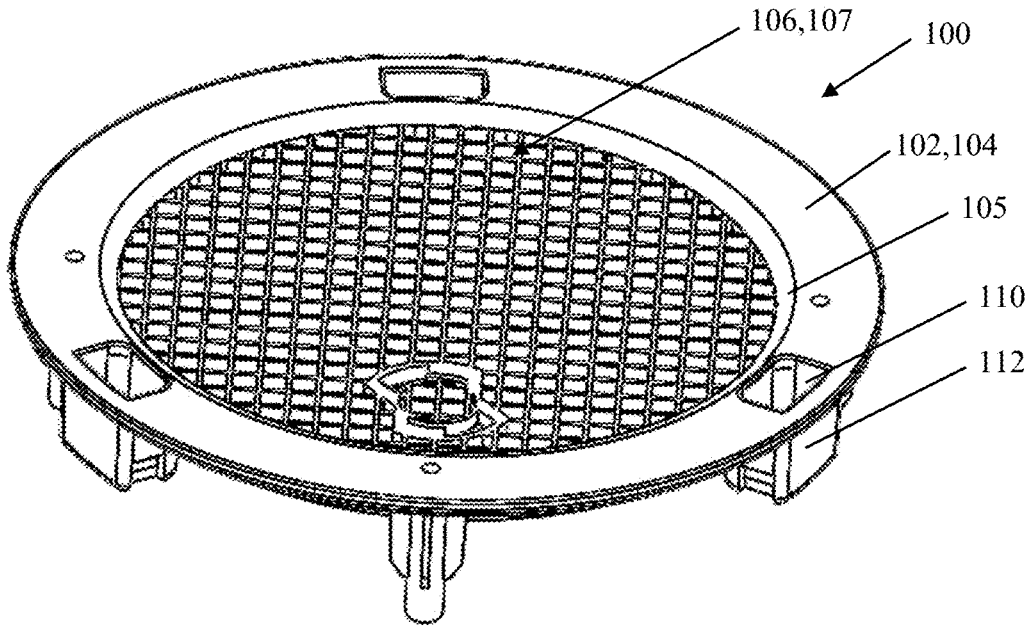
FIG. 4 is a side perspective view of the insect screen of FIG. 3.

Referring now to FIGS. 3 and 4, an insect screen 100 according to an embodiment of the present disclosure is shown. The screen 100 includes a circular body 102 having a continuous outer rim 104 surrounding a screen portion 106. The screen portion 106 defines a periodic pattern or grid of openings 107 sized to selectively permit the passage of at least one specific type or species of insect therethrough, while blocking or preventing the passage of other types of insects. A transition portion 105 is defined between the outer rim 104 and the screen portion 106. The transition portion 105 extends obliquely from the outer rim 104 such that a top surface of the screen portion 106 is recessed relative to, or oriented below, a top surface of the outer rim 104.

The body 102 defines a plurality of openings 110 formed through the outer rim 104. The openings 110 may be sized to receive, for example, posts (e.g., the posts 30 of FIGS. 1 and 2, or similar) supporting a roof (e.g., the roof 12) of the trap. As set forth above, the openings 110 are arranged circumferentially about the outer rim 104, and may be spaced equally apart (e.g., 120 degrees). Each opening 110 may be defined within an interior of a corresponding hollow protrusion 112 extending from an underside of the body 102, and more particularly the outer rim 104. Each hollow protrusion 112 is sized to be received within a corresponding opening formed in a body of the trap, such as the receiving holes 36 formed in the housing 14 as described above. As can be visualized from FIGS. 1 and 2, the insect screen 100 may be installed onto the trap assembly 10 by removing the roof 12, and fitting the screen onto the protective screen 46, and reinstalling the roof. In other embodiments, the insect screen 100 may be installed by removing the roof and replacing the protective screen 46 with the insect screen, and reinstalling the roof. In either embodiment, the screen 100 may be secured to the housing 14 via snap-fit, press-fit or fasteners. In still other embodiments, the inset screen 100 may be integrally formed with an existing portion of the housing 14.

Figure 5:
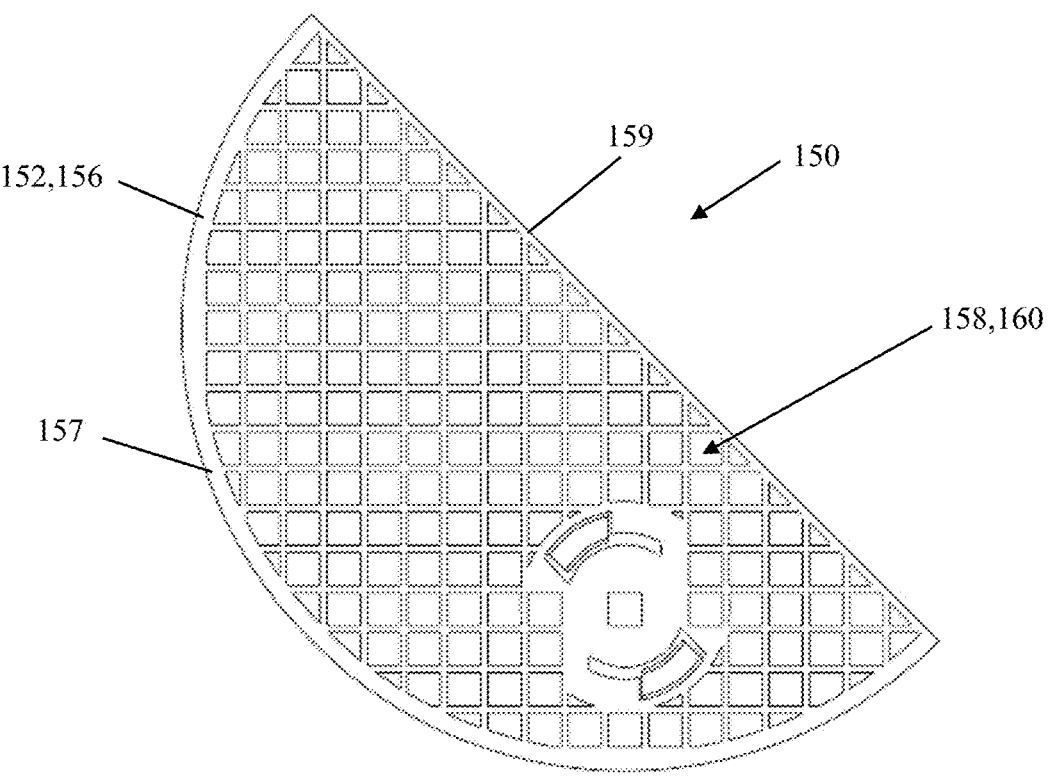
FIG. 5 is a top view of an insect screen according to another embodiment of the present disclosure.
Figure 6:
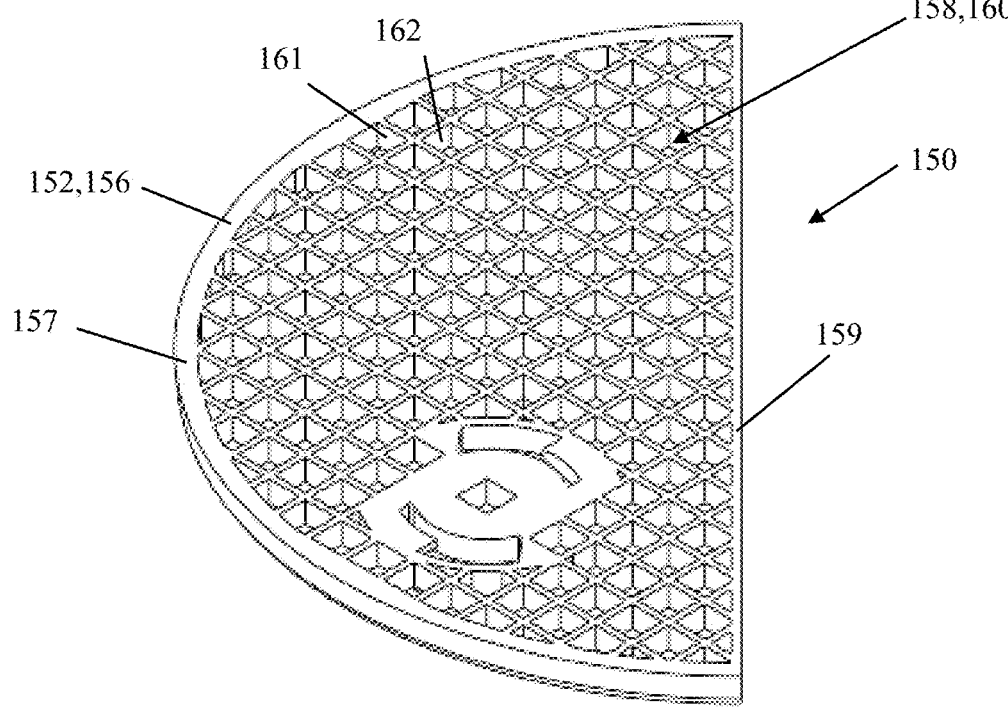
FIG. 6 is a side perspective view of the insect screen of FIG. 5.

Referring to FIGS. 5 and 6, according to another embodiment of the present disclosure, an insect screen is adapted to be installed within an existing insect trap without the need to remove the roof thereof, by way of example. More specifically, the insect screen is defined by a plurality of screen sections 150. A plurality of screen sections 150 (e.g., two sections), may be joined or abutted to form a single insect screen. By forming the screen in sections 150, each section may be sized fit through an existing opening of an insect trap, for example, the gap 34 formed between the roof 12 and the body 14 as shown in FIG. 1. After insertion, each section 150 may be arranged either over an existing protective screen (e.g., the protective screen 46), or used in place of such a protective screen, and aligned with one another to define a complete or continuous screen. In one embodiment, as shown in FIG. 1, the screen sections 150 may be fitted within the recess defined above the screen 46, or above the top surface 22 of the housing 14.

An exemplary body 152 of each section 150 includes a continuous outer peripheral wall 156 surrounding an inner screen portion 158 defining a periodic pattern or grid of openings 160, as set forth above with respect to the embodiment of FIGS. 3 and 4. In the exemplary bisected embodiment, the peripheral wall 156 includes an arcuate portion 157 extending over, for example, 180 degrees. At least one straight or linear segment 159 connects the free ends of the arcuate portion 157. As can be visualized from the figures, the straight segments 159 of two adjacent sections 150 are adapted (e.g., sized and shaped) to abut one another in an installed state of the screen 150. In this way, the assembled screen 150 defines a continuous circular or perimeter or peripheral wall bisected by the two abutting straight segments 159. In other embodiments, each section of the screen may comprise the arcuate portions defined over, for example, 120 or 90 degrees in arc length, and may comprise two straight segments for connecting the free ends of the arcuate portions. In this way, the screen may be formed by any number individual sections for facilitating ease of introduction into the trap.

According to each of the described embodiments, the screen portion 106,158 may be defined by a plurality of first linear segments (e.g., segments 161), and a plurality of second linear segments (e.g., segments 162) arranged perpendicularly to and intersecting the plurality of first linear segments. With respect to the orientation shown in the figures, the segments may be described as a plurality of vertically oriented segments, and a plurality of horizontally oriented segments, or as orthogonally oriented rows and columns. The first and second linear segments may be formed integrally with a remainder of the bodies 102, 152 by, for example, a molding operation. In other embodiments, a grid of circular holes may be formed, by way of example only. Of course, openings of various shapes are also possible, such as a honeycomb pattern, diamond shaped pattern, or any other repeatable grid pattern shape.

As the insect screen according to embodiments of the present disclosure is removably insertable into the trap, it may be added or replaced as desired in order to configure the trap for targeting different insect populations, or to prevent the capture of specific populations. In this way, an existing trap may be retrofitted with a new screen, or supplemented with an additional screen, in order to alter its functionality. In one particularly advantageous embodiment, each of the openings 107,160 are no more than 6 mm in size. More specifically, a maximum dimension of an opening in a direction normal to an axial direction of the opening (i.e., the direction of insect passage through the opening) is less than or equal to 6 mm. Specifically, in the case of a pattern of circular openings, the maximum diameter of each opening is less than or equal to 6 mm. In the case of a square opening, the maximum dimension of each side of the square not greater than ⅛th of an inch or 4.25 mm. It has been shown that an opening of this size allows the passage of most universally targeted insects (e.g., mosquitos and flies), while preventing the passage of moths (i.e., Lepidoptera) and other non-targeted insects often deemed beneficial to the environment. In another embodiment, the maximum dimension of any shaped opening is not greater than ⅛th of an inch or 4.25 mm. Further, the thickness of the screen portions 106,158 can vary from 0.05-0.15 inches in the case of a molded (e.g., polymer) screen. In other embodiments, the screen may be formed of sheet metal, with perforations or punch outs forming a grid pattern of ⅛th inch holes.

The above-described embodiments of the present disclosure optimize the particular size, shape and arrangement of the insect screen openings to provide unexpected functionality not present in prior art arrangements. These characteristics specifically address the particular problems found in prior art insect traps, including the capture of undesired insects, by way of example. The characteristics of the openings of the prior art are maximized so as not affect the capture of any insects by the trap while blocking block foreign objects from entering the fan area of the trap (e.g., fingers). Conversely, embodiments provided herein are specifically adapted to block the passage of select insects therethrough. These embodiments achieve the stated objectives with the greatest efficiency and overall performance. The embodiments described herein provide unexpected improvements in insect capture and retention, or elimination, while maintaining safe operation of the trap.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An insect trap comprising:
a housing defining an insect intake opening;
a receptacle removably attached to a bottom of the housing and in communication with the intake opening;
a rotating fan assembly arranged within the housing and adapted to draw air in through the intake opening in a direction toward the receptacle;
an insect screen removably attached over the intake opening and defining a plurality of first openings sized to prevent insects of a predetermined average size from entering the intake opening, the insect screen formed from a plurality of components; and
a cover arranged over the housing and raised above a surface of the housing by a plurality of supports, the supports defining a receiving space between the cover and the intake opening through which each of the components of the insect screen is separately insertable through the receiving space,
wherein the plurality of components forming the insect screen are sized to be fitted within the housing and assembled into the insect screen, in an assembled state, a maximum dimension of the insect screen is greater than a maximum dimension of the receiving space such that the assembled insect screen is not insertable into or removable from the trap through the receiving space.

2. The insect trap of claim 1, wherein each of the plurality of first openings comprises square opening having sides with a length less than or equal to ⅛th of an inch or 4.25 mm.

3. The insect trap of claim 1, wherein a maximum dimension of each of the plurality of first openings is 6 mm.

4. The insect trap of claim 1, wherein the insect screen includes a continuous peripheral wall, the plurality of first openings formed in a periodic pattern within the peripheral wall.

5. The insect trap of claim 1, wherein each of the plurality of components includes a continuous peripheral wall defined by an arcuate segment and a linear segment connected between ends of the arcuate segment.

6. The insect trap of claim 5, wherein each of the plurality of components defines a semi-circular shape.

7. The insect trap of claim 6, wherein the assembled insect screen comprises two of the components abutted along their linear segments and defining a circular shape.

8. The insect trap of claim 1, wherein the insect screen comprises a continuous peripheral wall arranged about the plurality of first openings.

9. The insect trap of claim 8, further comprising a plurality of support openings arranged radially about and extending through the peripheral wall, the plurality of supports arranged within the plurality of support openings for supporting the cover above the housing.

10. The insect trap of claim 9, further comprising a plurality of protrusions extending from a side of the peripheral wall facing the housing, the protrusions defining the plurality of support openings.

11. The insect trap of claim 10, wherein the protrusions are received by the housing for attaching the insect screen to the housing.

12. An insect trap comprising:
a housing defining an insect intake opening;
a receptacle removably attached to a bottom of the housing and in communication with the intake opening;
a rotating fan assembly arranged within the housing and adapted to draw air in through the intake opening in a direction toward the receptacle; and
an insect screen removably attached over the intake opening and defining a plurality of first openings sized to prevent insects from entering the intake opening, the insect screen formed from a plurality of components, the insect screen is insertable into the trap, the plurality of components forming the insect screen are sized to be fitted within the housing and assembled into the insect screen, wherein in an assembled state, the insect screen is not insertable into or removable from the trap.

13. The insect trap of claim 12, further comprising a cover arranged over the housing and raised above a surface of the housing by a support, the support defining a receiving space between the cover and the intake opening.

14. The insect trap of claim 13, wherein each of the components of the insect screen are separately insertable through the receiving space.

15. An insect trap comprising:
a housing defining an insect intake opening;
a receptacle removably attached to a bottom of the housing and in communication with the intake opening;
a rotating fan assembly arranged within the housing and adapted to draw air in through the intake opening in a direction toward the receptacle; and
an insect screen removably attached over the intake opening and defining a plurality of first openings sized to prevent insects from entering the intake opening, the insect screen formed from a plurality of components, each of the plurality of components including a continuous peripheral wall defined by an arcuate segment and a linear segment connected between ends of the arcuate segment.

16. The insect trap of claim 15, wherein each of the plurality of components defines a semi-circular shape.

17. The insect trap of claim 16, wherein the assembled insect screen comprises two of the components abutted along their linear segments and defining a circular shape.

18. The insect trap of claim 15, further comprising a cover arranged over the housing and raised above a surface of the housing by supports, the supports defining a receiving space between the cover and the intake opening.

19. The insect trap of claim 18, wherein the plurality of components are sized to be fitted within the housing and assembled into the insect screen, in an assembled state, a maximum dimension of the insect screen is greater than a maximum dimension of the receiving space such that the assembled insect screen is not insertable into or removable from the trap through the receiving space.

* * * * *